US006811357B1

(12) United States Patent
Haug

(10) Patent No.: US 6,811,357 B1
(45) Date of Patent: Nov. 2, 2004

(54) RETAINING WALL ASSEMBLY

(76) Inventor: Konrad Haug, 134 Strattford Rd., New Hyde Park, NY (US) 11040

( * ) Notice: Subject to any disclaimer, the term of this patent is extended or adjusted under 35 U.S.C. 154(b) by 113 days.

(21) Appl. No.: 10/207,751

(22) Filed: Jul. 30, 2002

(51) Int. Cl.$^7$ ............................................. E02D 17/00
(52) U.S. Cl. ........................ 405/285; 405/286; 52/102; 52/315
(58) Field of Search .................. 52/102, 315, 169.5, 52/475.1, 477, 781.5; 256/24; 47/33; 405/284, 285, 286

(56) References Cited

U.S. PATENT DOCUMENTS

| 1,247,107 | A | * | 11/1917 | Graham ........................ 256/19 |
| 1,428,470 | A | * | 9/1922 | Brainerd ....................... 52/605 |
| 1,509,424 | A | * | 9/1924 | Garrard ........................ 52/779 |
| 1,578,861 | A | * | 3/1926 | Squire ......................... 405/285 |
| 1,761,614 | A | * | 6/1930 | Collier ........................ 405/285 |
| 2,210,218 | A | * | 8/1940 | Hamilton ..................... 405/285 |
| 3,195,311 | A | * | 7/1965 | Wilhelm ...................... 405/267 |
| 4,050,254 | A | * | 9/1977 | Meheen et al. .............. 405/285 |
| 4,193,584 | A | * | 3/1980 | Wieser ......................... 256/19 |
| 4,325,457 | A | * | 4/1982 | Docherty et al. ........... 181/210 |
| 4,465,403 | A | * | 8/1984 | Schreiber et al. ........... 405/267 |
| 4,572,711 | A | * | 2/1986 | Benson et al. .............. 405/286 |
| 4,674,593 | A | * | 6/1987 | McCarty ...................... 181/210 |
| 4,735,022 | A | * | 4/1988 | Pardo .......................... 52/220.1 |
| 4,884,378 | A | * | 12/1989 | Scheiwiller ................. 52/169.4 |
| 4,957,395 | A | * | 9/1990 | Nelson ......................... 405/287 |
| 5,010,707 | A | * | 4/1991 | Nelson et al. ................ 52/605 |
| 5,360,296 | A | * | 11/1994 | Angelette .................... 405/285 |
| 5,406,758 | A | * | 4/1995 | Baum .......................... 52/169.5 |
| 6,000,182 | A | * | 12/1999 | Keenan ........................ 52/295 |

FOREIGN PATENT DOCUMENTS

| JP | 5-51936 | * | 5/1993 | ........... E02D/29/02 |
| JP | 6-280235 | * | 9/1994 | ............. E02B/3/14 |

* cited by examiner

Primary Examiner—Robert Canfield

(57) ABSTRACT

A retaining wall assembly for providing a decorative barrier for flowerbeds and along driveways and sidewalks. The retaining wall assembly includes a base assembly including elongate base members being adapted to be disposed in a ground; and also includes elongate support members being spacedly attached to the elongate base members and extending upwardly therefrom; and further includes wall support members being disposed between the elongate support members; and also includes wall structures being mounted upon the base assembly and to the elongate support members and about the wall support members.

5 Claims, 4 Drawing Sheets

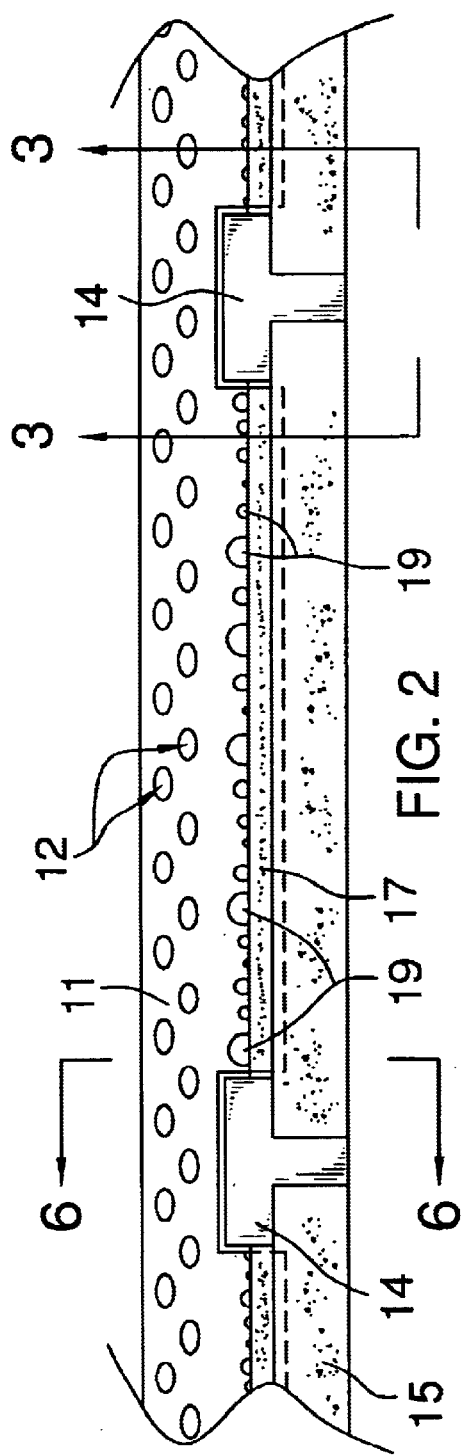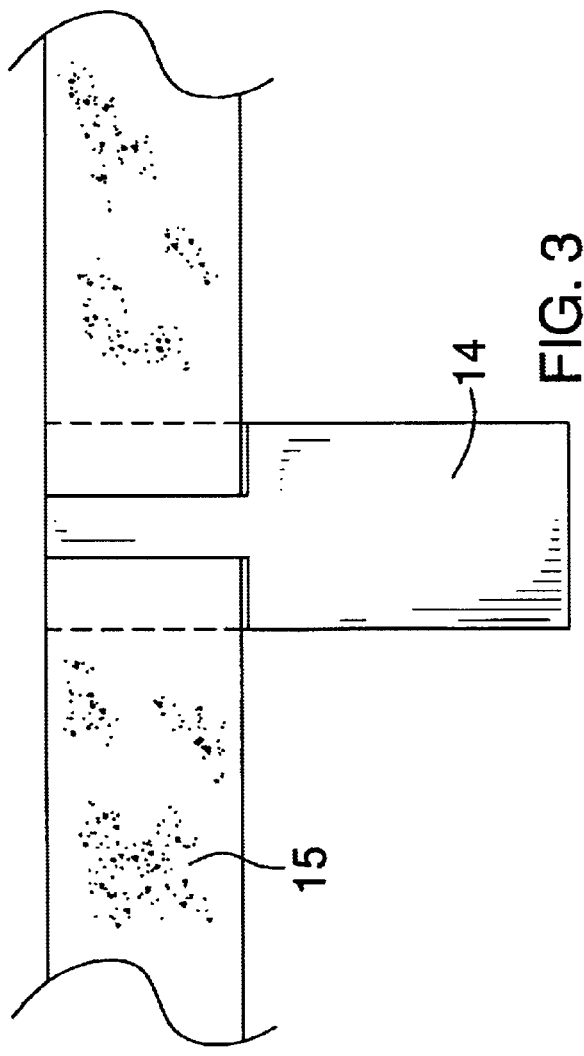

RETAINING WALL ASSEMBLY

BACKGROUND OF THE INVENTION

1. Field of the Invention

The present invention relates to retaining walls for flowerbeds in particular and more particularly pertains to a new retaining wall assembly for providing a decorative barrier for flowerbeds and along driveways and sidewalks.

2. Description of the Prior Art

The use of retaining walls for flowerbeds in particular is known in the prior art. More specifically, retaining walls for flowerbeds in particular heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,010,707; U.S. Pat. No. 2,210,218; U.S. Pat. No. 4,050,254; U.S. Pat. No. 1,578,861; U.S. Pat. No. Des. 362,311; and U.S. Pat. No. Des. 364,903.

While these devices fulfill their respective, particular objectives and requirements, the aforementioned patents do not disclose a new retaining wall assembly. The prior art includes descriptions of inventions having retaining walls and support members supports the walls.

SUMMARY OF THE INVENTION

The general purpose of the present invention, which will be described subsequently in greater detail, is to provide a new retaining wall assembly which has many of the advantages of the retaining walls for flower beds in particular mentioned heretofore and many novel features that result in a new retaining wall assembly which is not anticipated, rendered obvious, suggested, or even implied by any of the prior art retaining walls for flower beds in particular, either alone or in any combination thereof. The present invention includes a base assembly including elongate base members being adapted to be disposed in a ground; and also includes elongate support members being spacedly attached to the elongate base members and extending upwardly therefrom; and further includes wall support members being disposed between the elongate support members; and also includes wall structures being mounted upon the base assembly and to the elongate support members and about the wall support members. None of the prior art includes the combination of elements described in the present invention.

There has thus been outlined, rather broadly, the more important features of the retaining wall assembly in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new retaining wall assembly which has many of the advantages of the retaining walls for flower beds in particular mentioned heretofore and many novel features that result in a new retaining wall assembly which is not anticipated, rendered obvious, suggested, or even implied by any of the prior art retaining walls for flower beds in particular, either alone or in any combination thereof.

Still another object of the present invention is to provide a new retaining wall assembly for providing a decorative barrier for flowerbeds and along driveways and sidewalks.

Still yet another object of the present invention is to provide a new retaining wall assembly that is easy and convenient to construct and use.

Even still another object of the present invention is to provide a new retaining wall assembly that is long lasting and is impervious to the changing weather conditions.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a top plan view of the present invention.

FIG. 3 is a partial longitudinal cross-sectional view of the present invention.

DESCRIPTION OF THE PREFERRED EMBODIMENT

Figure 1:
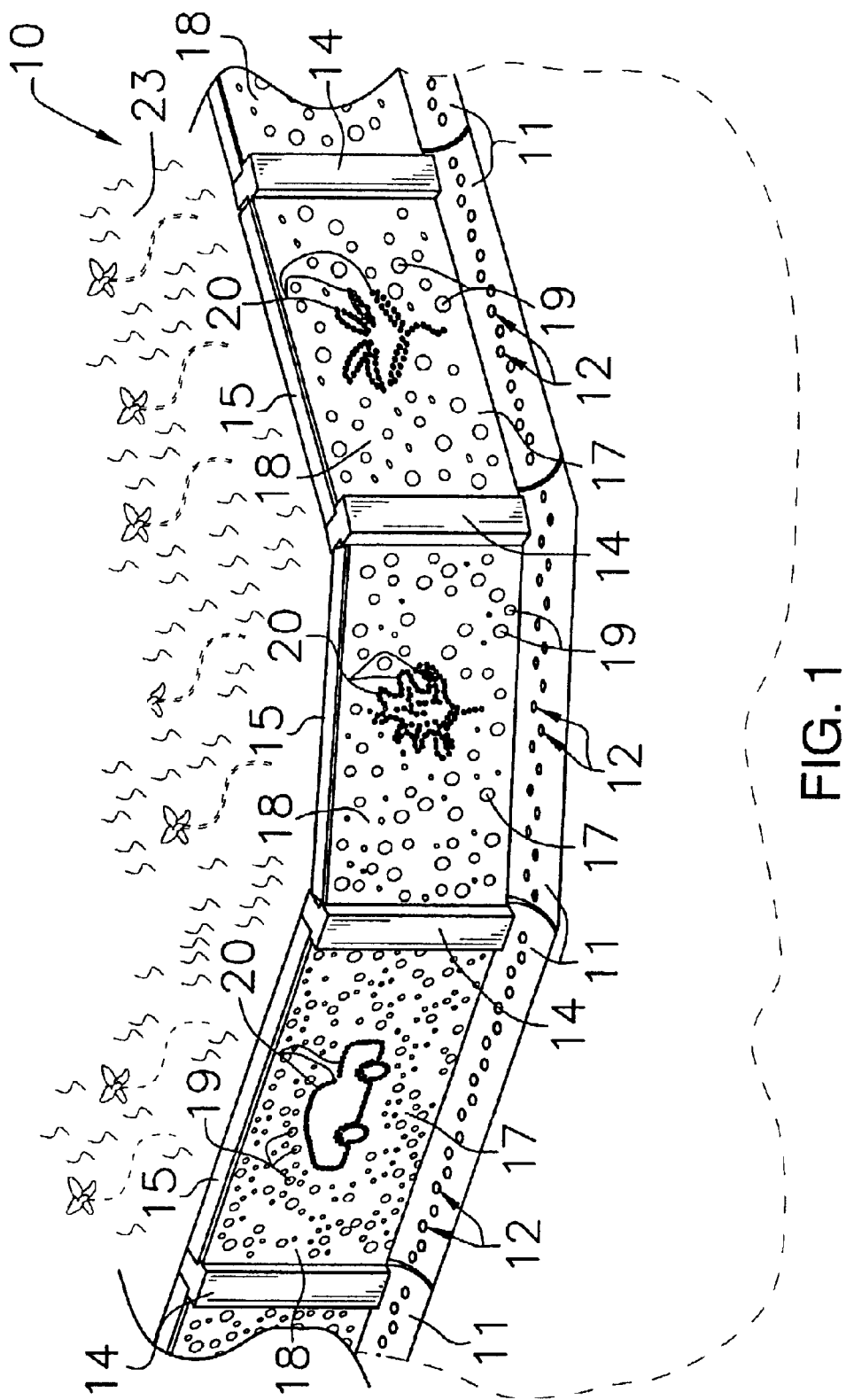
FIG. 1 is a perspective view of a new retaining wall assembly according to the present invention.
Figure 4:
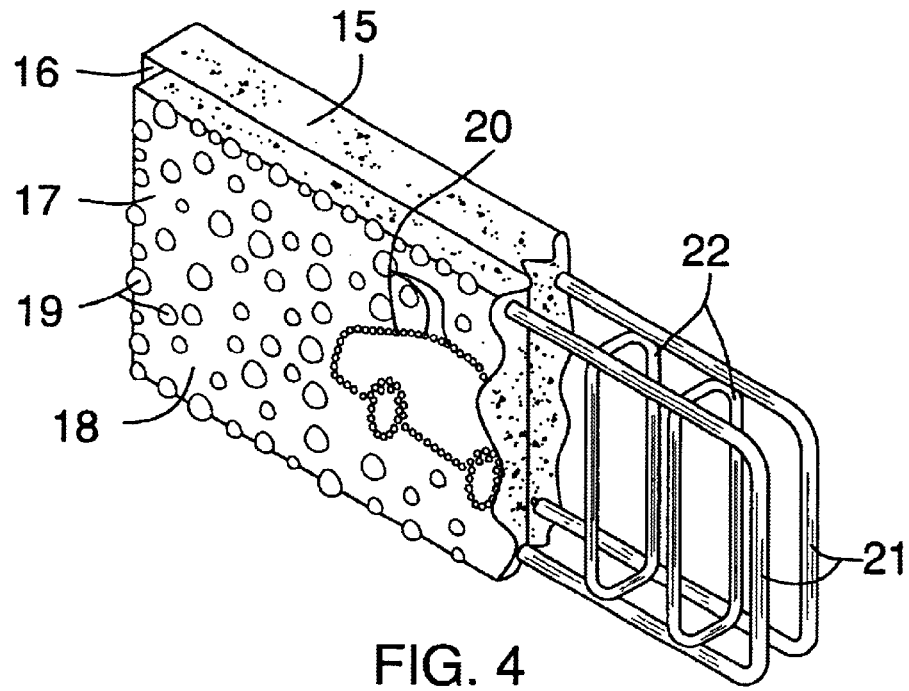
FIG. 4 is a partial cutaway perspective view of the present invention.
Figure 5:
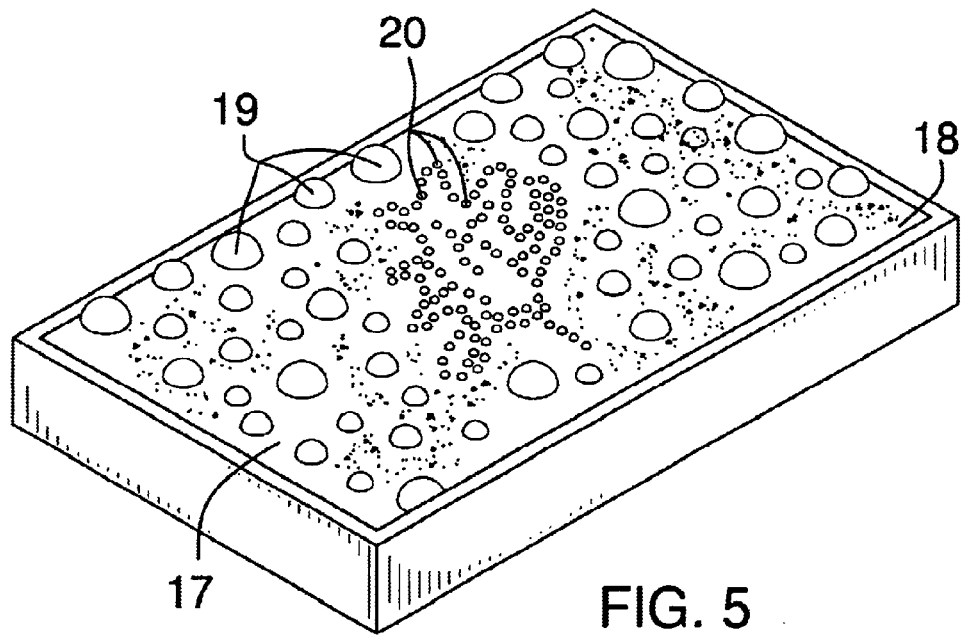
FIG. 5 is a perspective view of the present invention.
Figure 6:
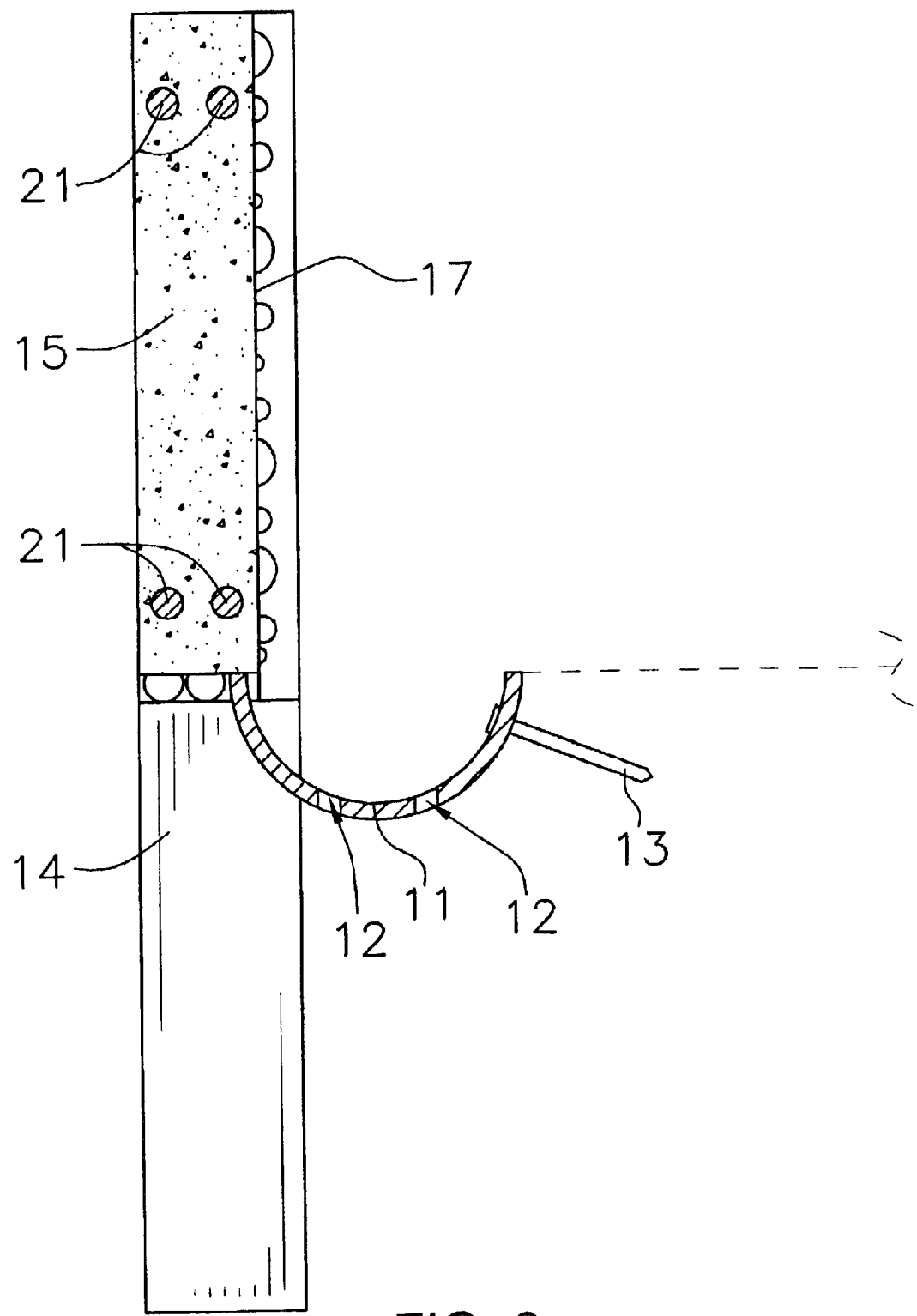
FIG. 6 is a lateral cross-sectional view of the present invention.

With reference now to the drawings, and in particular to FIGS. 1 through 6 thereof, a new retaining wall assembly embodying the principles and concepts of the present invention and generally designated by the reference numeral 10 will be described.

As best illustrated in FIGS. 1 through 6, the retaining wall assembly 10 generally comprises a base assembly including elongate base members 11 being adapted to be disposed in a ground 23. Each of the base members 11 has a plurality of drainage holes 12 being disposed through walls thereof. The base assembly also including spike members 13 being conventionally disposed through the walls of the base members and being adapted to be imbedded in the ground 23.

Elongate support members 14 are spacedly and conventionally engaged to the elongate base members 11 and extend upwardly therefrom. Each of the elongate support members 14 is generally a post having a lower portion and an upper portion which has a lateral T-shaped cross-section with the elongate support members being made of cement. Wall support members 21,22 are conventionally disposed between the elongate support members 14.

Wall structures are conventionally mounted upon the base assembly and upon the elongate support members 14. The wall structure includes a plurality of first rectangular-shaped cement slabs 15 each having a definite thickness and also having a front side 16 and ends which are securely and conventionally attached to a respective pair of the elongate support members 14, and also includes a plurality of second rectangular-shaped cement slabs 17 being conventionally attached to the front sides 16 of the first rectangular-shaped cement slabs 15 with each of the second rectangular-shaped cement slabs 17 having a thickness smaller than that of a respective first rectangular-shaped cement slab 15. The wall structure further includes a plurality of stones 19,20 being conventionally imbedded in front sides 18 of the second rectangular-shaped cement slabs 17. The stones 19,20 include light-colored stones 19 which are randomly disposed about the front sides 18 of the second rectangular-shaped cement slabs 17, and also include dark-colored stones 20 which are arranged in patterns upon the front sides 18 of the second rectangular-shaped cement slabs 17 with the patterns being that of distinctive shaped objects such as flowers, trees, and cars. The wall support members 21,22 include endless bar loops 21 being disposed in and extending lengthwise of the first rectangular-shaped cement slabs 15 for solidifying the first rectangular-shaped cement slabs 15, and also include endless cross bar loop members 22 being conventionally attached to the endless bar loops 21 and being spacedly and laterally disposed in the first rectangular-shaped cement slabs 15 for also solidifying the first rectangular-shaped cement slabs 15.

In use, the user constructs the retaining wall structure 10 about a flowerbed and along sidewalks and driveways with the retaining wall structure 10 creating a barrier against which soil and dirt is disposed.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the retaining wall assembly. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A retaining wall assembly comprising:

a base assembly including elongate base members being adapted to be disposed in a ground, each of said base members having a plurality of drainage holes being disposed through walls thereof, said base assembly also including spike members being disposed through said walls of said base members and being adapted to be imbedded in the ground;

elongate support members being spacedly engaged to said elongate base members and extending upwardly therefrom, each of said elongate support members being generally a post having a lower portion and an upper portion having a lateral T-shaped cross-section, said elongate support members being made of cement;

wall support members being disposed between said elongate support members; and wall structures being mounted upon said base assembly and to said elongate support members and about said wall support members.

2. The retaining wall assembly as described in claim 1, wherein each said wall structure includes a plurality of first rectangular-shaped cement slabs each having a definite thickness and also having a front side and ends which are securely attached to a respective pair of said elongate support members, and also includes a plurality of second rectangular-shaped cement slabs being attached to said front sides of said first rectangular-shaped cement slabs with each of said second rectangular-shaped cement slabs having a thickness smaller than that of a respective said first rectangular-shaped cement slab.

3. The retaining wall assembly as described in claim 2, wherein said wall structure further includes a plurality of stones being imbedded in front sides of said second rectangular-shaped cement slabs.

4. The retaining wall assembly as described in claim 3, wherein said stones include light-colored stones which are randomly disposed about said front sides of said second rectangular-shaped cement slabs, and also include dark-colored stones which are arranged in patterns upon said front sides of said second rectangular-shaped cement slabs, said patterns being that of distinctive shaped objects such as flowers, trees, and cars.

5. The retaining wall assembly as described in claim 4, wherein said wall support members include endless bar loops being disposed in and extending lengthwise of said first rectangular-shaped cement slabs for solidifying said first rectangular-shaped cement slabs, and also include endless cross bar loop members being attached to said endless bar loops and being spacedly and laterally disposed in said first rectangular-shaped cement slabs for also solidifying said first rectangular-shaped cement slabs.

* * * * *